US010536666B1

(12) United States Patent
Robertson

(10) Patent No.: US 10,536,666 B1
(45) Date of Patent: Jan. 14, 2020

(54) SYSTEMS AND METHODS FOR TRANSMITTING AGGREGATED VIDEO DATA

(71) Applicant: Facebook Technologies, LLC, Menlo Park, CA (US)

(72) Inventor: John Enders Robertson, Newark, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/253,902

(22) Filed: Jan. 22, 2019

(51) Int. Cl.
*H04N 7/08* (2006.01)
*H04N 7/10* (2006.01)

(52) U.S. Cl.
CPC ............. *H04N 7/0806* (2013.01); *H04N 7/10* (2013.01)

(58) Field of Classification Search
CPC ............................... H04N 7/0806; H04N 7/10
USPC .... 348/723, 725, 719, 706, 731, 513, 14.08, 348/142, 143, 159, 51, 52, 48, 47; 345/633, 7, 8
See application file for complete search history.

(56) References Cited

U.S. PATENT DOCUMENTS

| 9,503,687 | B2* | 11/2016 | Kratz | H04N 7/15 |
| 9,912,717 | B2* | 3/2018 | Ha | G06T 19/006 |
| 2007/0024706 | A1* | 2/2007 | Brannon, Jr. | H04N 7/17318 348/142 |
| 2007/0182867 | A1* | 8/2007 | Price, III | H04N 5/50 348/731 |
| 2009/0309975 | A1* | 12/2009 | Gordon | H04N 5/23206 348/159 |
| 2011/0205433 | A1* | 8/2011 | Altmann | H04N 9/475 348/513 |
| 2011/0242288 | A1* | 10/2011 | Francisco | H04N 21/242 348/51 |
| 2013/0127980 | A1* | 5/2013 | Haddick | G06F 3/013 348/14.08 |
| 2013/0147838 | A1* | 6/2013 | Small | G06F 3/013 345/633 |
| 2014/0118541 | A1* | 5/2014 | Lasko | G08B 13/19682 348/143 |

\* cited by examiner

*Primary Examiner* — Jefferey F Harold
*Assistant Examiner* — Mustafizur Rahman
(74) *Attorney, Agent, or Firm* — FisherBroyle, LLP

(57) ABSTRACT

A system for transmitting camera data may include (i) identifying at least two streams of video data that are each produced by a different video source, (ii) receiving a set of at least two frames of video data that includes exactly one frame from each of the at least two streams of video data, (iii) placing, within an image, the set of at least two frames of video data received from the at least two streams of video data, and (iv) transmitting the image that includes the set of at least two frames of video data received from the at least two streams of video data via a single transmission channel. Various other apparatuses, systems, and methods, are also disclosed.

20 Claims, 12 Drawing Sheets

SYSTEMS AND METHODS FOR TRANSMITTING AGGREGATED VIDEO DATA

BACKGROUND

Augmented reality experiences, where virtual objects are projected onto or overlie real landscapes, and virtual reality experiences, where a user is surrounded in an entirely virtual world, are becoming increasingly popular. One common form factor for augmented and virtual reality experiences is a wearable headset with a screen that displays the augmented or virtual world to the wearer. Augmented reality headsets and virtual reality headsets may use motion tracking to accurately place the user in their environment and display the correct objects and trigger the right cues for the user's location. One method of motion tracking involves placing cameras on the headset to identify visual cues to location as well as track the movement of one or more controllers held by the user.

Unfortunately, traditional systems of motion tracking have various flaws. Many camera configurations may leave gaps in camera coverage where a user can move the controller without the controller being visible to the cameras. However, adding additional cameras to fix these coverage gaps may create a new problem, that of efficiently transmitting video data from multiple cameras over a limited-bandwidth channel. Accordingly, the instant disclosure identifies and addresses a need for improved transmission of data from multiple cameras attached to the same device, such as a wearable headset.

SUMMARY

As will be described in greater detail below, the instant disclosure describes apparatuses, systems, and methods for transmitting video streams from multiple cameras over limited-bandwidth connections in the form of images.

In one example, a computer-implemented method for efficiently transmitting data from cameras may include (i) identifying at least two streams of video data that are each produced by a different video source, (ii) receiving a set of at least two frames of video data that includes exactly one frame from each of the at least two streams of video data, (iii) placing, within an image, the set of at least two frames of video data received from the at least two streams of video data, and (iv) transmitting the image that includes the set of at least two frames of video data received from the at least two streams of video data via a single transmission channel.

In one embodiment, placing, within the image, the set of at least two frames of video data may include arranging each frame of video data within the set of at least two frames of video data within the image based at least in part on a characteristic of the frame of video data. In one example, the characteristic may include a readout start time of the frame of video data. Additionally or alternatively, the characteristic may include an exposure length of the frame of video data. In one embodiment, arranging each frame of video data within the image based at least in part on the characteristic of the frame of video data may include arranging each frame of video data side by side horizontally across the image such that the vertical placement of each frame of video data within the image corresponds to the characteristic.

In one embodiment, placing, within the image, the set of at least two frames of video data may include encoding metadata that describes the set of at least two frames of video data within the image. In some examples, encoding the metadata may include encoding a timestamp of each frame from the set of at least two frames of video data. In some examples, encoding the metadata may include encoding at least one camera setting used to create each frame from the set of at least two frames of video data. Additionally or alternatively, encoding the metadata may include encoding, for each frame from the set of at least two frames of video data, an identifier of a type of function being performed by a camera that recorded the frame.

In one embodiment, the at least two streams of video data may be produced by at least two cameras that each include a different exposure length. In some examples, transmitting the image via the single transmission channel may include transmitting the image via a transmission channel that has limited bandwidth. In some examples, transmitting the image via the single transmission channel may include transmitting the image via a cable.

In one embodiment, the at least two streams of video data may be produced by cameras that are coupled to a same device. In some examples, transmitting the image via the single transmission channel may include transmitting the image from a first component of a device to a second component of the device.

In one embodiment, placing, within the image, the set of at least two frames of video data received from the at least two streams of video data may include encoding the image via a default image encoder for at least one of a camera that produced one of the at least two streams of video data or a processor that processes the image.

In one embodiment, a system for implementing the above-described method may include at least one physical processor and physical memory that includes computer-executable instructions that, when executed by the physical processor, cause the physical processor to (i) identify at least two streams of video data that are each produced by a different video source, (ii) receive a set of at least two frames of video data that includes exactly one frame from each of the at least two streams of video data, (iii) place, within an image, the set of at least two frames of video data received from the at least two streams of video data, and (iv) transmit the image that includes the set of at least two frames of video data received from the at least two streams of video data via a single transmission channel.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify at least two streams of video data that are each produced by a different video source, (ii) receive a set of at least two frames of video data that includes exactly one frame from each of the at least two streams of video data, (iii) place, within an image, the set of at least two frames of video data received from the at least two streams of video data, and (iv) transmit the image that includes the set of at least two frames of video data received from the at least two streams of video data via a single transmission channel.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
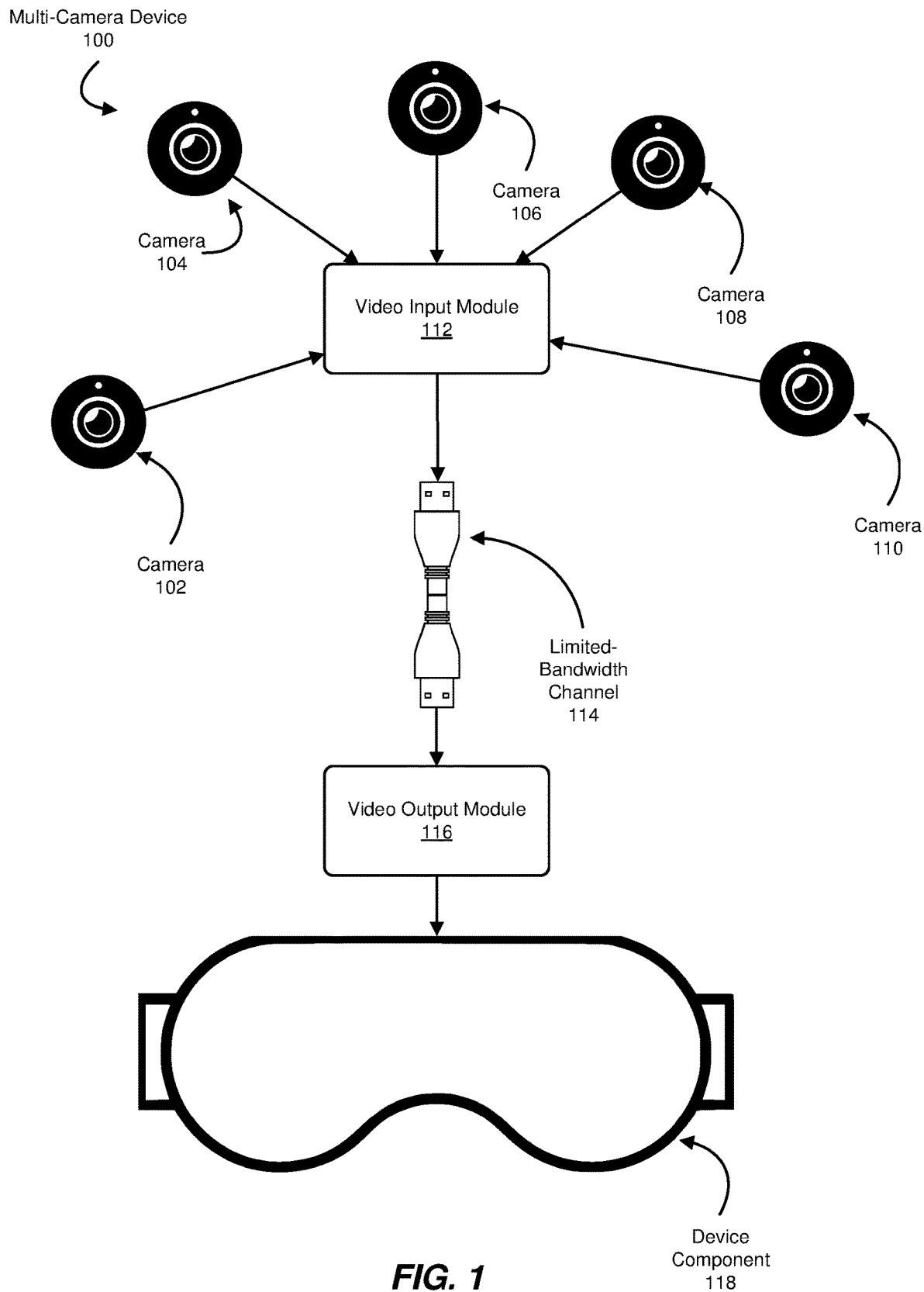
FIG. 1 is an illustration of an exemplary multi-camera device.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for efficiently transmitting video data from multiple cameras via a limited-bandwidth channel. In some embodiments, cameras on a wearable head-mounted display or other device with multiple cameras (e.g., other wearable device, vehicle, drone, etc.) may transmit streaming video data to other components of the same device and/or to other devices via a single communication channel. In some examples, this communication channel may have limited bandwidth, such as a wireless link or a Universal Serial Bus (USB) cable. By combining frames from multiple video streams into a single image that may also include metadata and then transmitting that image, the systems and methods described herein may more efficiently transmit data recorded by video cameras over limited-bandwidth channels. In some embodiments, the systems described herein may create images that can be encoded and decoded by standard codecs, improving interoperability. Additionally, the systems described herein may reduce the use of computing resources (such as energy expenditure) compared to methods involving frame buffers, improving the functioning of low-power devices such as headsets. In some examples, the systems and methods described herein may improve the field of video streaming by transmitting video data more efficiently. Additionally, the systems and methods described herein may improve the functioning of a computing device by reducing the resources required to transmit data recorded by multiple video cameras.

FIG. 1 is an illustration of an exemplary multi-camera device 100. Although illustrated as a head-mounted display, multi-camera device 100 may represent any type of device that includes multiple cameras and/or video sources. The term "video source," as used herein, may refer to a camera, one of several streams of data produced by a camera (e.g. each containing sub-frames), and/or any other suitable source of video and/or image data. Examples of multi-camera device 100 may include, without limitation, automobiles, other types of vehicles, drones, wearable devices, personal computing devices, and/or gaming systems. In one embodiment, multi-camera device 100 may include cameras 102, 104, 106, 108, and/or 110 that may send video streams to a video input module 112. In some embodiments, video input module may send video data to a video output module 116 via a limited-bandwidth channel 114. In one embodiment, video output module 116 may process and/or otherwise use the video data and/or forward video data and/or data derived from the video data to a device component 118. In some embodiments, cameras 102, 104, 106, 108, and/or 110 may produce a volume of video stream data that challenges the transmission capacity of limited-bandwidth channel 114. Thus, the systems and methods described herein may process the video stream data into a series of images for more efficient transmission via limited-bandwidth channel 114.

Figure 2:
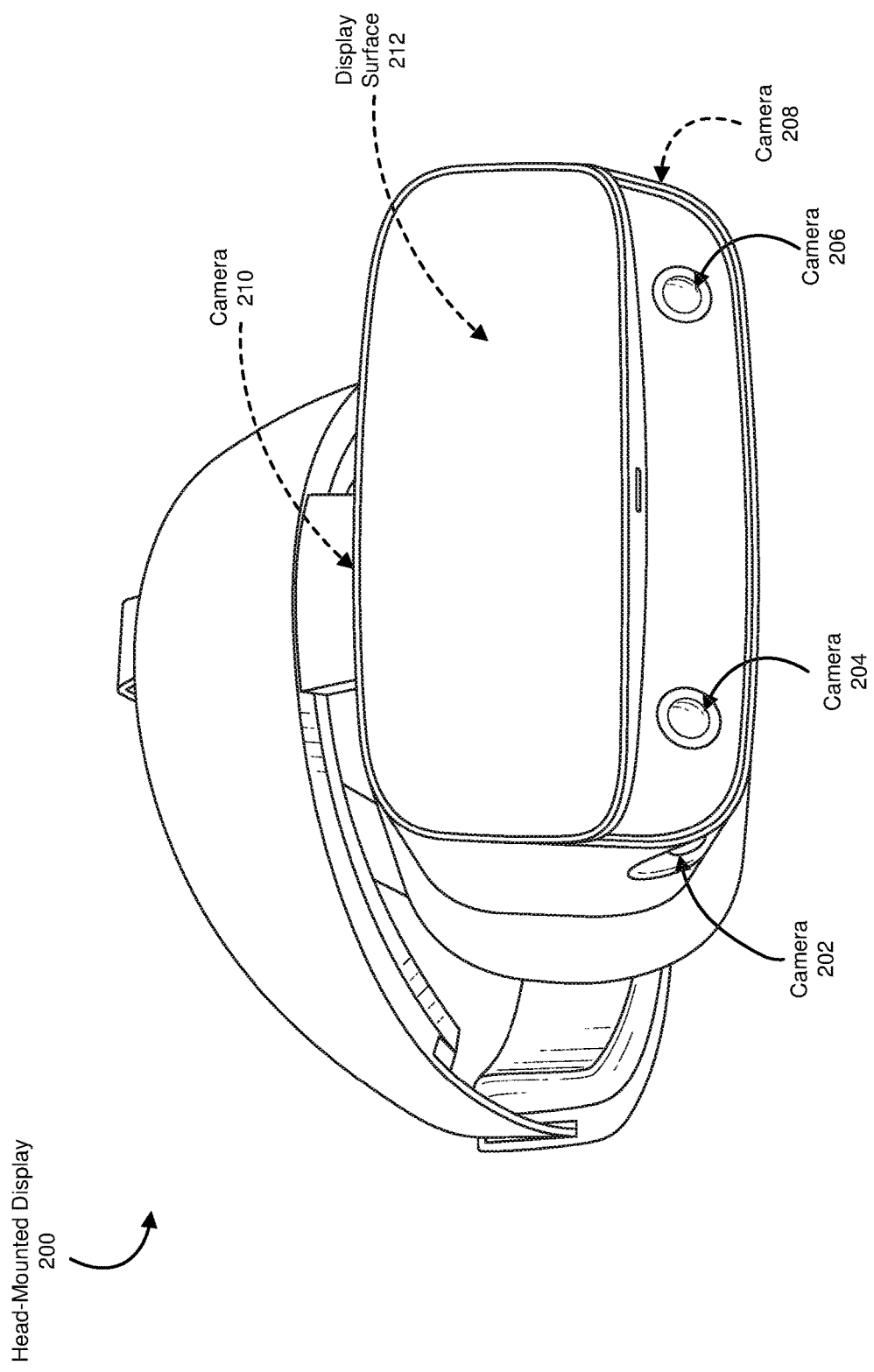
FIG. 2 is an illustration of an exemplary head-mounted display with multiple cameras.

FIG. 2 is an illustration of an exemplary head-mounted display that includes multiple cameras. In some embodiments, a head-mounted display 200 may include cameras 202, 204, 206, 208, and/or 210, and/or a display surface 212. In some embodiments, camera 202 may be mounted on the right surface of head-mounted display 200, camera 208 may be mounted on the left surface of head-mounted display 200, camera 204 may be mounted on the right side of the front, camera 206 may be mounted on the left side of the front, and/or camera 210 may be mounted centrally on the front of head-mounted display 200. In some embodiments, cameras 202, 204, 206, and/or 208 may be mounted on rigid mounting points while camera 210 may be mounted on a non-rigid mounting point. In one embodiment, cameras 202, 204, 206, and/or 208 may be mounted to a metal bracket set within head-mounted display 200.

In some embodiments, cameras 202, 204, 206, 208, and/or 210 may each be mounted flush with surfaces of head-mounted display 200 (rather than protruding from head-mounted display 200). In one embodiment, camera 202 may be located behind camera 204 (relative to the front of head-mounted display 200) and/or may be angled at a downward angle, such as 45° downward. In some embodiments, camera 202 may be located at a different downward angle, such as 30°, 60°, or any other appropriate angle. Similarly, camera 208 may be located behind camera 206 and/or may be angled at a downward angle. In some embodiments, cameras 204, 206, and 210 may all be mounted on the same surface of the head-mounted display. In other embodiments, cameras 204 and/or 206 may be mounted on one front surface of the head-mounted display while camera 210 may be mounted on a separate front surface of the head-mounted display.

Figure 3:
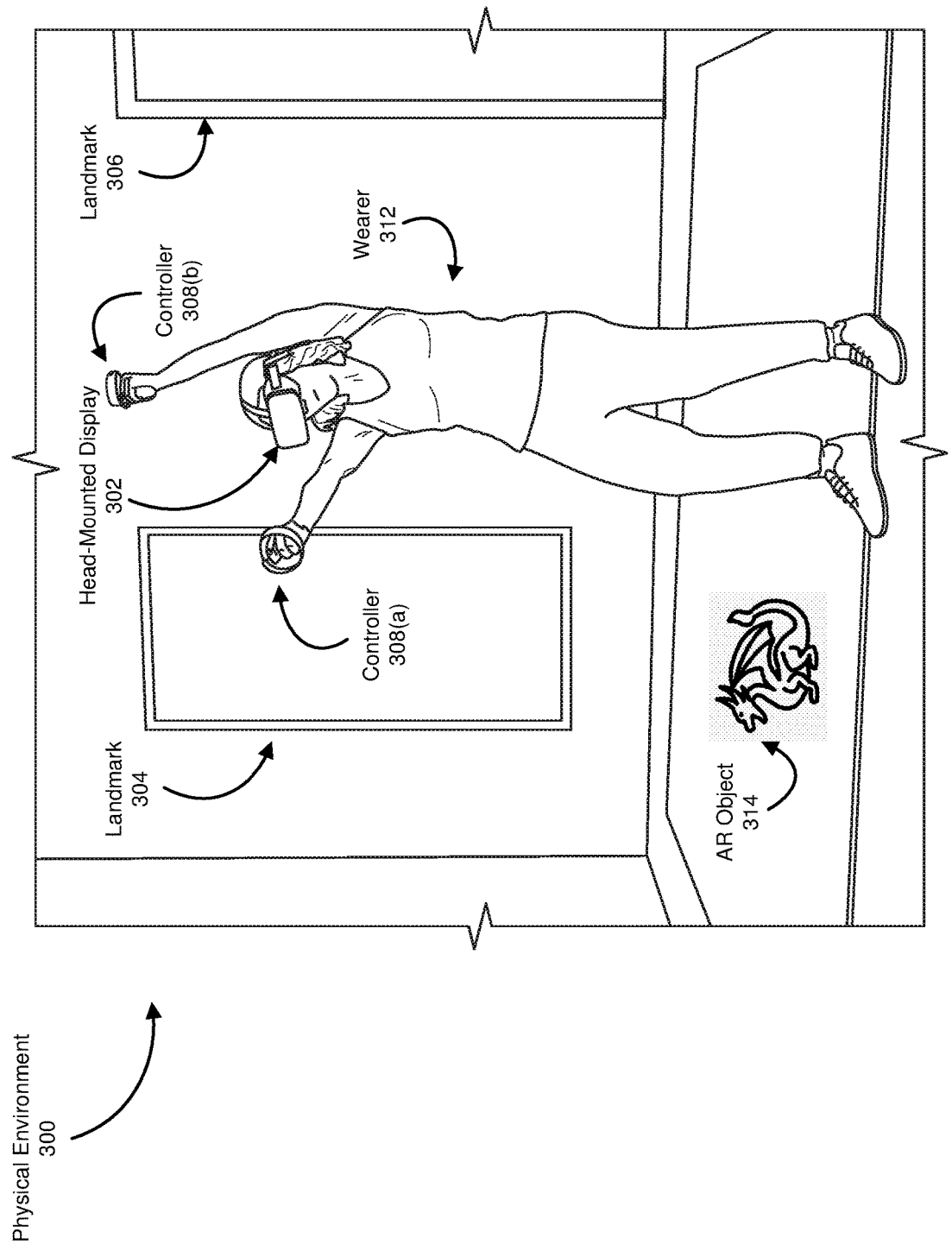
FIG. 3 is an illustration of an exemplary head-mounted display in context.

FIG. 3 is an illustration of an exemplary head-mounted display in context. In some examples, a wearer 312 may wear a head-mounted display 302 and/or hold a controller 308(a) and/or a controller 308(b). In one example, cameras on head-mounted display 302 may capture video data that identifies a landmark 304 and/or a landmark 306 that enables the systems described herein to determine the location of wearer 312 within a physical environment 300. In some embodiments, the systems described herein may use two or more cameras mounted on head-mounted display 302 with overlapping fields of view to triangulate the location of landmark 304 and/or landmark 306. In one example, the systems described herein may use landmark 304 and/or landmark 306 to triangulate the location of wearer 312.

In some examples, cameras on head-mounted display 302 may motion track controller 308(a) and/or controller 308(b). In one example, an augmented reality system may use information about the location of wearer 312 and/or the locations of controllers 308(a) and/or 308(b) to display an augmented reality object 314 on a display surface of head-mounted display 302. In some examples, augmented reality object 314 may appear to wearer 312 to be situated within physical environment 300 and/or the augmented reality system may use visual input data from cameras of head-mounted display 302 to display a portion of physical environment 300 on the display surface of head-mounted display 302. In other examples, augmented reality object 314 may appear to be situated within a virtual landscape entirely unrelated to physical environment 300.

In some examples, the display surface of head-mounted display 302 may display different augmented reality objects to wearer 312 based on the location of wearer 312 within physical environment 300. For example, head-mounted display 302 may only display augmented reality object 314 when wearer 312 is within a certain radius of the position of augmented reality object 314. Additionally or alternatively, head-mounted display 302 may display different augmented reality objects based on input received from controllers 308(a) and/or 308(b) including relative positions of controllers 308(a) and/or 308(b). For example, wearer 312 may swing controller 308(a) like a sword in order to control a virtual sword, and the augmented reality system may cease displaying augmented reality object 314 in response to detecting that the virtual sword controlled by controller 308(a) intersected with augmented reality object 314 (e.g., because wearer 312 has slain the dragon). In some embodiments, in order to accomplish motion and/or controller tracking, systems within head-mounted display 302 may transmit video data from various cameras mounted on head-mounted display 302 to other systems embedded within head-mounted display 302 via a limited-bandwidth channel, such as a USB cable. Additionally or alternatively, head-mounted display 302 may transmit video data to remote systems, such as a gaming system, via a limited-bandwidth channel such as a wireless connection.

Figure 4:
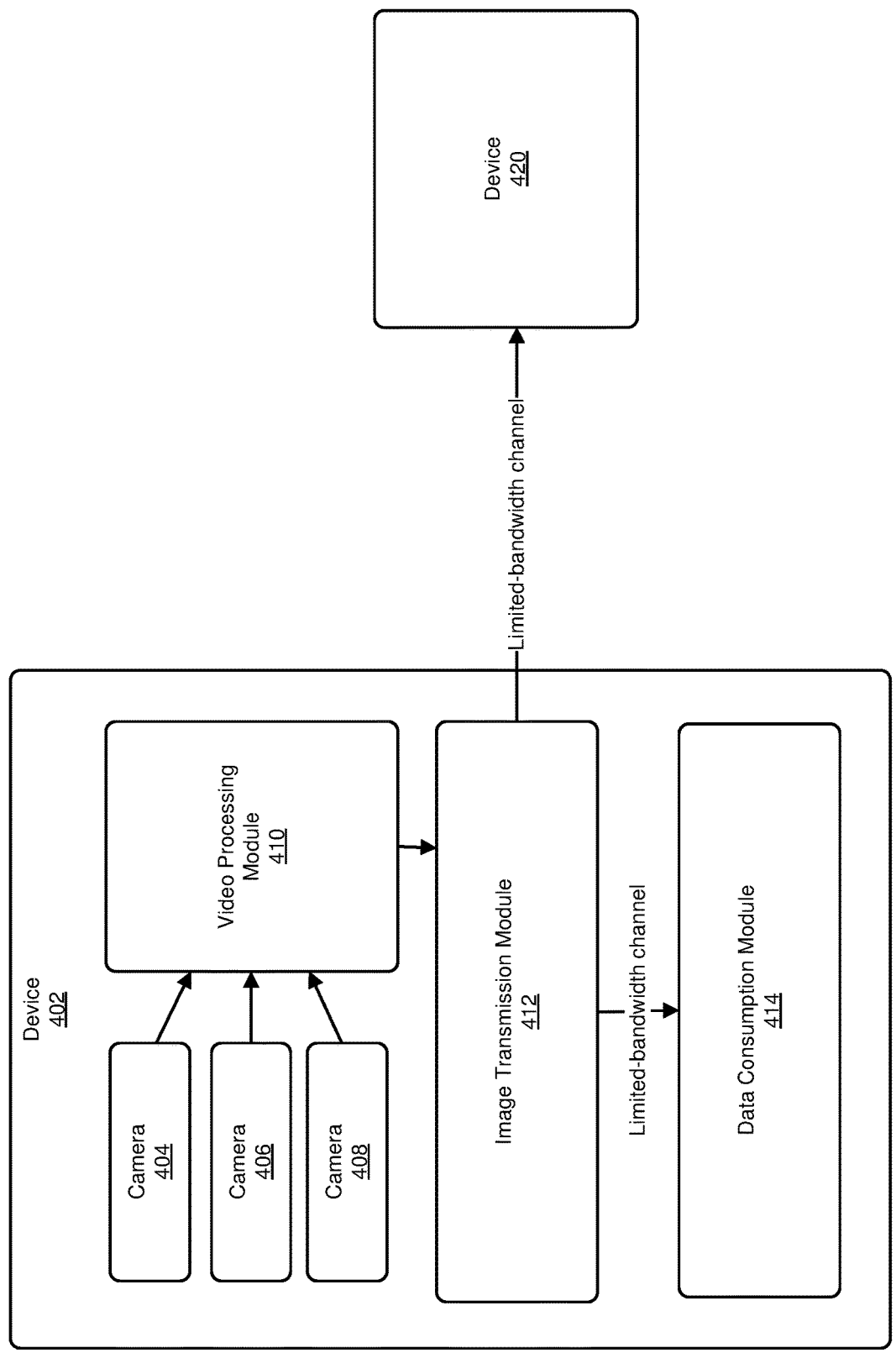
FIG. 4 is a block diagram of an exemplary system for processing video data for transmission over limited-bandwidth channels.

FIG. 4 is a block diagram of an exemplary system for processing video data into images for transmission over limited-bandwidth channels. In one embodiment, a device 402 may include and/or receive data from multiple cameras, such as cameras 404, 406, and/or 408. In some embodiments, device 402 may be a head-mounted display. Additionally or alternatively, device 402 may be another type of wearable device, a vehicle, and/or a drone. In one embodiment, a video processing module 410 may receive streaming video data from cameras 404, 406, and/or 408 and produce still images that each include at most one frame of video data from each camera. In some examples, video processing module 410 may send data to an image transmission module 412 that may transmit the still images via a limited-bandwidth channel. In one example, image transmission module 412 may transmit the images to a data consumption module 414 that is also hosted on device 402. Data consumption module 414 may perform various tasks relating to the data included in the images, such as constructing a combined video stream with images from different cameras and/or processing images to make determinations about information contained within the images. In some embodiments, image transmission module 414 may send the images to data consumption module 414 via a physical cable with limited bandwidth. Additionally or alternatively, image transmission module 412 may transmit images to a device 420 that is not physically coupled to device 402. In some embodiments, device 402 may represent, without limitation, a wearable device, a server, and/or a personal computing device. In one embodiment, transmission module 412 may transmit the images via a wireless connection with limited bandwidth.

Figure 5:
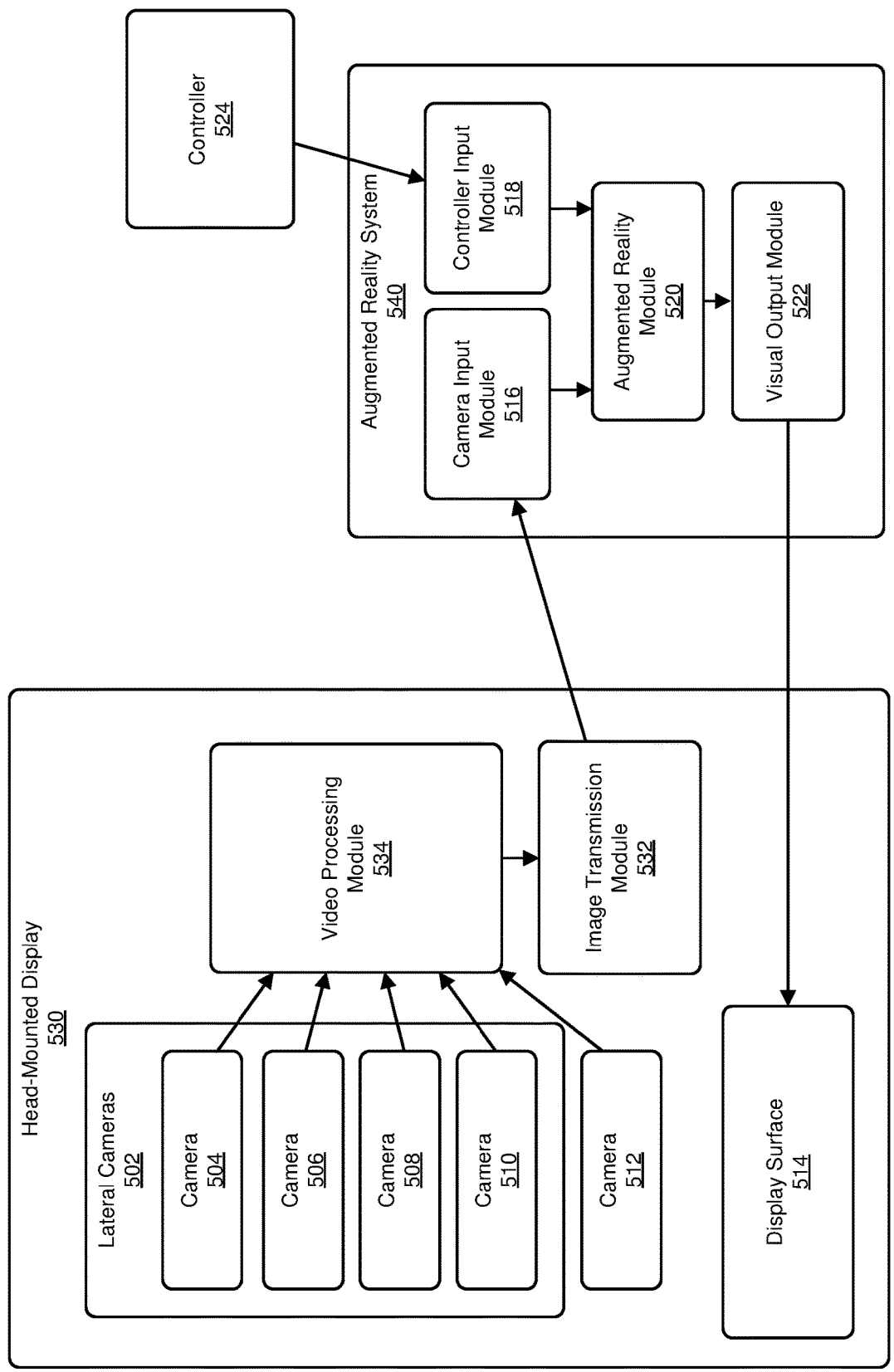
FIG. 5 is a block diagram of an exemplary system for processing visual data for wearable head-mounted displays.

FIG. 5 is a block diagram of an exemplary system for processing visual data for wearable head-mounted displays. The term "visual data," as used herein, generally refers to any data that can be captured by a camera. In some examples, visual data may include streaming video data. Additionally or alternatively, visual data may include recorded video data and/or still images. As illustrated in FIG. 5, a head-mounted display 530 may include lateral cameras 502, a central camera 512, and/or a display surface 514. In one embodiment, lateral cameras 502 may include cameras 504, 506, 508, and/or 510. In one embodiment, a video processing module 534 may receive streaming video data from cameras 504, 506, 508, 510, and/or 512. In some embodiments, video processing module 534 may process the streaming video data into a series of images that each include at most one frame from each camera stream. In some examples, the images may also include metadata about the camera frames. In one example, video processing module 534 may then send each image to an image transmission module 532 that transmits the images to other modules within head-mounted display 530 and/or external modules.

In some embodiments, an augmented reality system 540 may include a camera input module 516 that receives data from image transmission module 532, processes the data to extract relevant information (e.g., user location and/or controller position), and/or sends data to an augmented reality module 520. In one embodiment, augmented reality system may also include a controller input module 518 that receives input from a controller 524 and sends data to augmented reality module 520. In some embodiments, augmented reality module 510 may send data to a visual output module 522 that sends visual data to display surface 514 of head-mounted display 530. In some embodiments, some or all of augmented reality system 540 may be hosted on modules located within head-mounted display 530. Additionally or alternatively, some or all of augmented reality system 540 may be hosted on a separate device such as a local server, a local gaming system, and/or a remote server.

In some embodiments, camera input module 516 may process input data in a variety of ways. For example, camera 512 may be mounted on a non-rigid mounting, causing visual data from camera 512 to be blurry, originate from slightly different angles at different times (e.g., due to the bouncing of camera 512), and/or include other visual disturbances. In some examples, camera input module 516 may use visual data from cameras 504, 506, 508, and/or 510 to correct for visual disturbances in data from camera 512. For example, camera 504 may have a field of view that overlaps the field of view from camera 512, and camera input module 516 may use data from camera 504 to correct for issues in data from camera 512 originating from the portion of the field of view of camera 512 that overlaps the field of view of camera 504.

Figure 6:
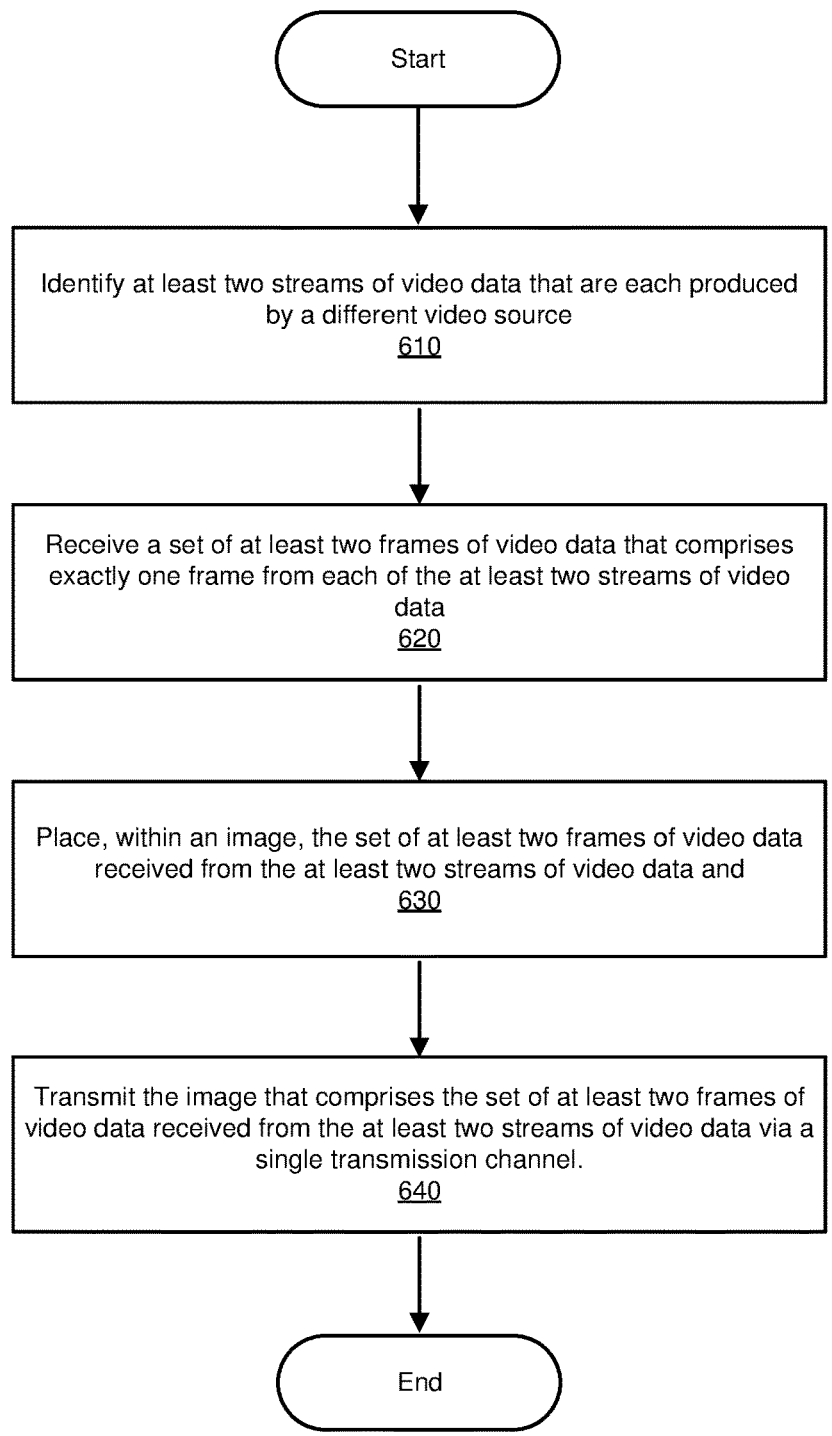
FIG. 6 is a flow diagram of an exemplary method for transmitting video stream data efficiently.

FIG. 6 is a flow diagram of an exemplary method 600 for efficiently transmitting data received from video cameras. As illustrated in FIG. 6, at step 610, one or more of the systems described herein may identify at least two streams of video data that are each produced by a different video source. In some examples, the video sources may include cameras mounted on a wearable device such as a head-mounted display. Additionally or alternatively, the cameras may be mounted on another type of device, such as an automobile, drone, and/or any other type of device that has two or more cameras.

In some embodiments, the video cameras may have different exposure lengths, readout start times, and/or readout end times. For example, a first camera may have a shorter exposure length than a second camera, leading to a difference in readout start and/or end time because the first camera finishes recording a frame before the second camera finishes recording a frame. The term "frame," as used herein, may refer to any still image derived from a video stream. Examples of frames may include, without limitation, full frames, sub-frames, cropped frames, and/or areas of interest within full frames. In some embodiment, different cameras may have different exposure lengths because the cameras are performing different functions. For example, a camera that is tracking landmarks to triangulate the location of a wearer of an augmented reality headset may have a longer exposure time than a camera that is tracking a position of a hand-held controller for an augmented reality system due to the comparatively slow change in location of the wearer compared to the faster change in position of the controller. In some examples, cameras may alternate between shorter and longer exposures.

Figure 7:
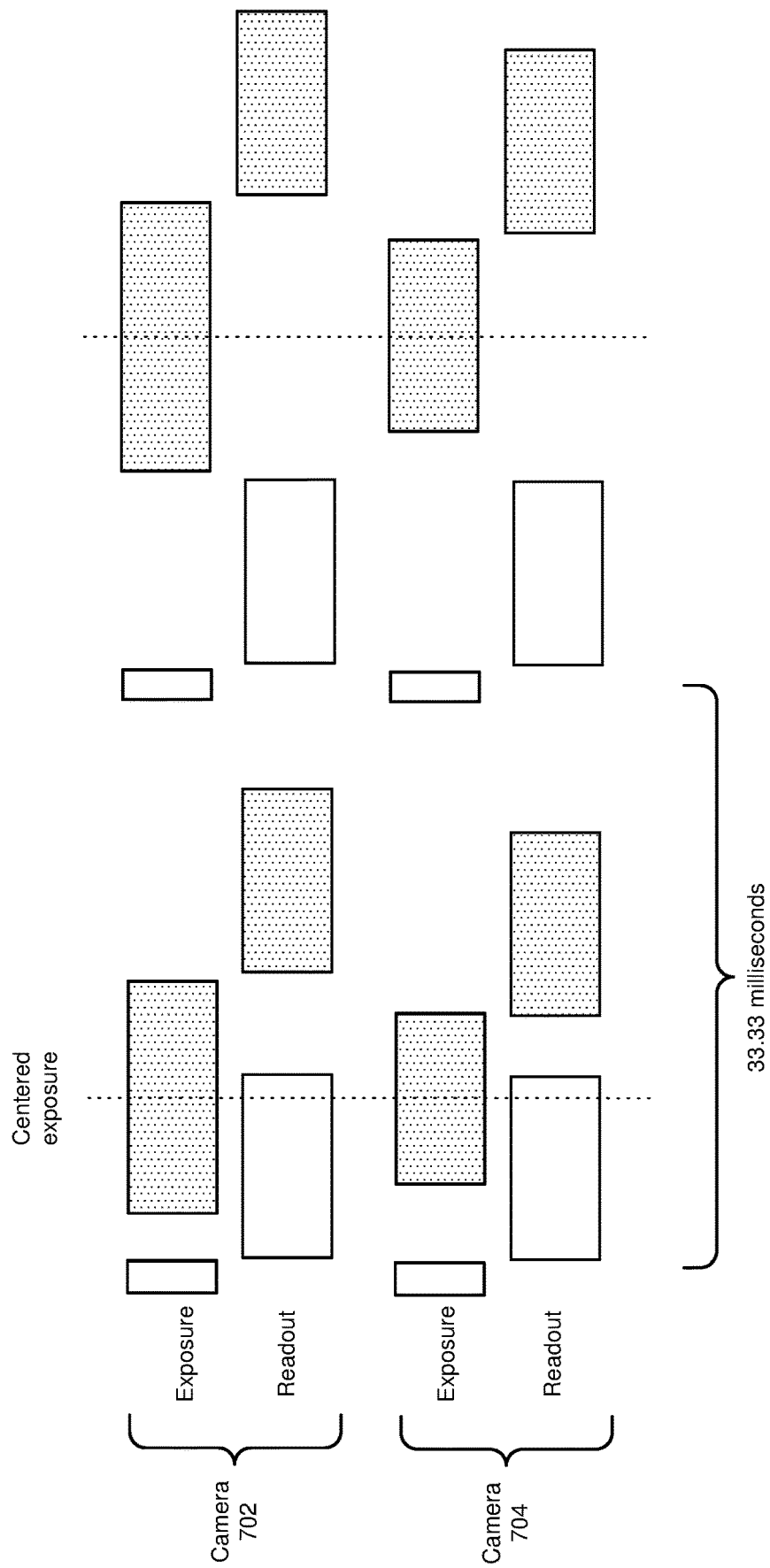
FIG. 7 is a block diagram of exemplary exposures and readouts for cameras.

In some examples, cameras may have temporally centered exposures. For example, as illustrated in FIG. 7, a camera 702 may alternate between short and long exposures, with each readout starting immediately following the end of the exposure. In this example, a camera 704 may similarly alternate between short and long exposures but may have shorter long exposures than camera 702. In some examples, the long exposures of cameras 702 and 704 may be centered such that each camera reaches the middle of its exposure duration at the same time. By centering the exposure times of multiple cameras, the systems described herein may more effectively collect frames from multiple cameras to place within a single image and/or may minimize the delay in waiting for various cameras to finish exposures without causing temporal gaps in camera coverage. In some examples, the exposure times may be centered to provide a common sampling point in time for the computer vision algorithms to more easily solve for the position of a wearer of an augmented reality headset and/or an augmented reality controller held by the wearer of the headset.

Returning to FIG. 6, at step 620, one or more of the systems described herein may receive a set of at least two frames of video data that includes exactly one frame from each of the at least two streams of video data. In some examples, the systems described herein may receive data from more than two cameras and/or the systems described herein may not receive a frame of data from each camera at each interval. For example, if a one camera has a significantly longer exposure than two other cameras, the systems described herein may not receive a frame from the longer-exposure camera during a particular frame-collection interval.

At step 630, one or more of the systems described herein may place, within an image, the set of at least two frames of video data received from the at least two streams of video data. In some embodiments, the systems described herein may arrange the frames based on one or more characteristics of the frames. For example, the systems described herein may arrange the frames based on the exposure duration and/or readout stand and/or end time of the frame. For example, as illustrated in FIG. 18, image 1802 may include frames 1814, 1816, and/or 1818 arranged in a horizontal line with each frame's vertical placement dictated by readout start time, with frames with earlier readout start times placed higher in the image. In some examples, the systems described herein may also encode metadata as blocks of pixels in the image that are each placed above and/or below the relevant frame. In one example, the systems described herein may encode each bit of metadata as an eight by eight block of pixels. For example, metadata 1804, 1806, and/or 1808 may each correspond to frames 1814, 1816, and/or 1818, respectively. Examples of metadata may include, without limitation, exposure duration, gain settings, timestamp, transmitted frame count, temperature, and/or other suitable camera setting and/or camera system information. In some embodiments, the metadata may include a flag that indicates the function being performed by the camera while recording the frame (e.g., wearer location tracking and/or controller tracker). In some embodiments, the image may be encoded using a standard encoder such as JPEG, BITMAP, and/or GIF.

Returning to FIG. 6, at step 640, one or more of the systems described herein may transmit the image that includes the set of at least two frames of video data received from the at least two streams of video data via a single transmission channel. In some embodiments, the systems described herein may transmit the image wirelessly. Additionally or alternatively, the systems described herein may transmit the image via a wired connection such as a USB cable. In some embodiments, the systems described herein may transmit the image from one component of a device (such as a head-mounted display) to another component of the same device. Additionally or alternatively, the systems described herein may transmit the image from one device to another device (e.g., a server and/or game console).

Figure 8:
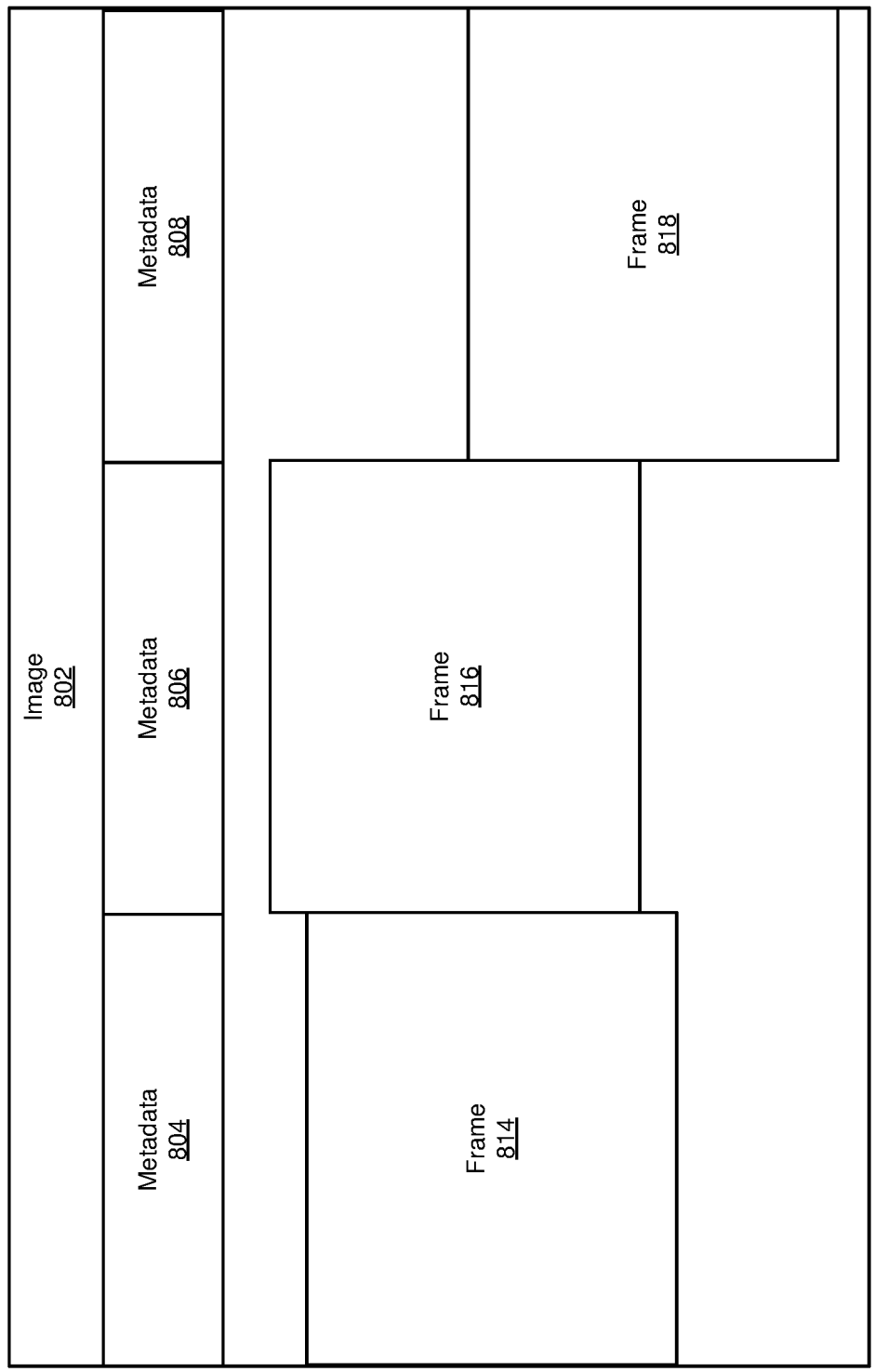
FIG. 8 is a block diagram of an exemplary image that includes camera frames.
Figure 9:
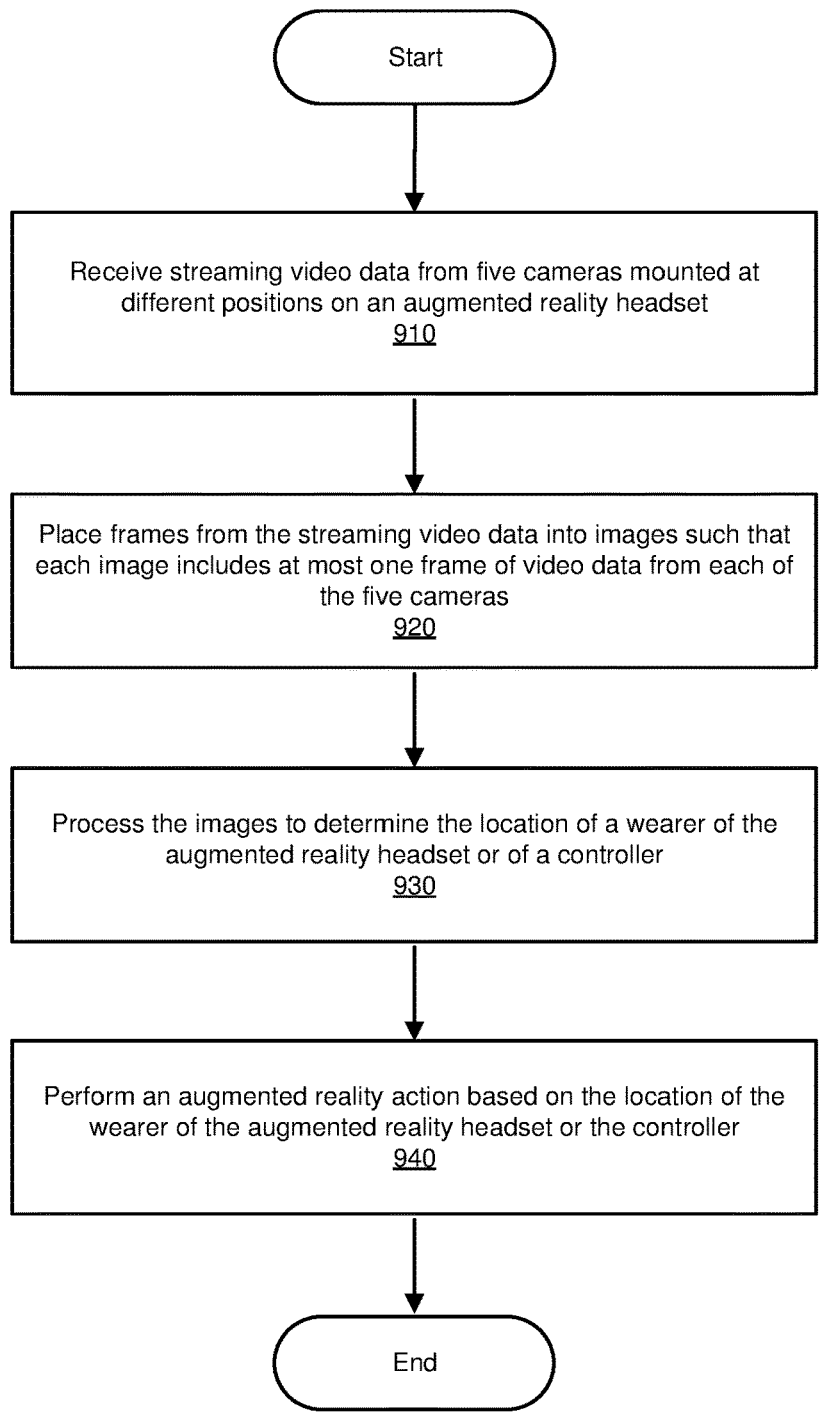
FIG. 9 is a flow diagram of an exemplary method for processing visual data for wearable head-mounted displays.

FIG. 8 is a flow diagram of an exemplary method 800 for processing visual data for wearable head-mounted displays. In some examples, at step 810, the systems described herein may receive streaming video data from five cameras mounted at different positions on an augmented reality headset. In some examples, different cameras may have different exposure lengths, may be angled at different angles, and/or may be mounted on different parts of the augmented reality headset. At step 820, the systems described herein may place frames from the streaming video data into images such that each image includes at most one frame of video data from each of the five cameras. In some examples, the systems described herein may arrange the frames based on exposure length and/or include metadata in the image. At step 830, the systems described herein may process the images to determine the location of a wearer of the augmented reality headset and/or of a controller. In some examples, the systems described herein may reassemble one or more video streams from a series of images that each includes video frames. Additionally or alternatively, the systems described herein may analyze the frames within the images. At step 840, the systems described herein may perform an augmented reality action based on the location of the wearer of the augmented reality headset or the controller.

For example, the systems described herein may trigger an augmented reality object to appear, disappear, move, and/or change.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data into instructions to an array of pixels, output a result of the transformation to display the image on the array of pixels, use the result of the transformation to display an image and/or video, and store the result of the transformation to create a record of displayed image and/or video. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with various types of artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 1000 in FIG. 10. Other artificial reality systems may include an NED that also provides visibility into the real world (e.g., AR system 1100 in FIG. 11) or that visually immerses a user in an artificial reality (e.g., VR system 1200 in FIG. 12). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Figure 10:
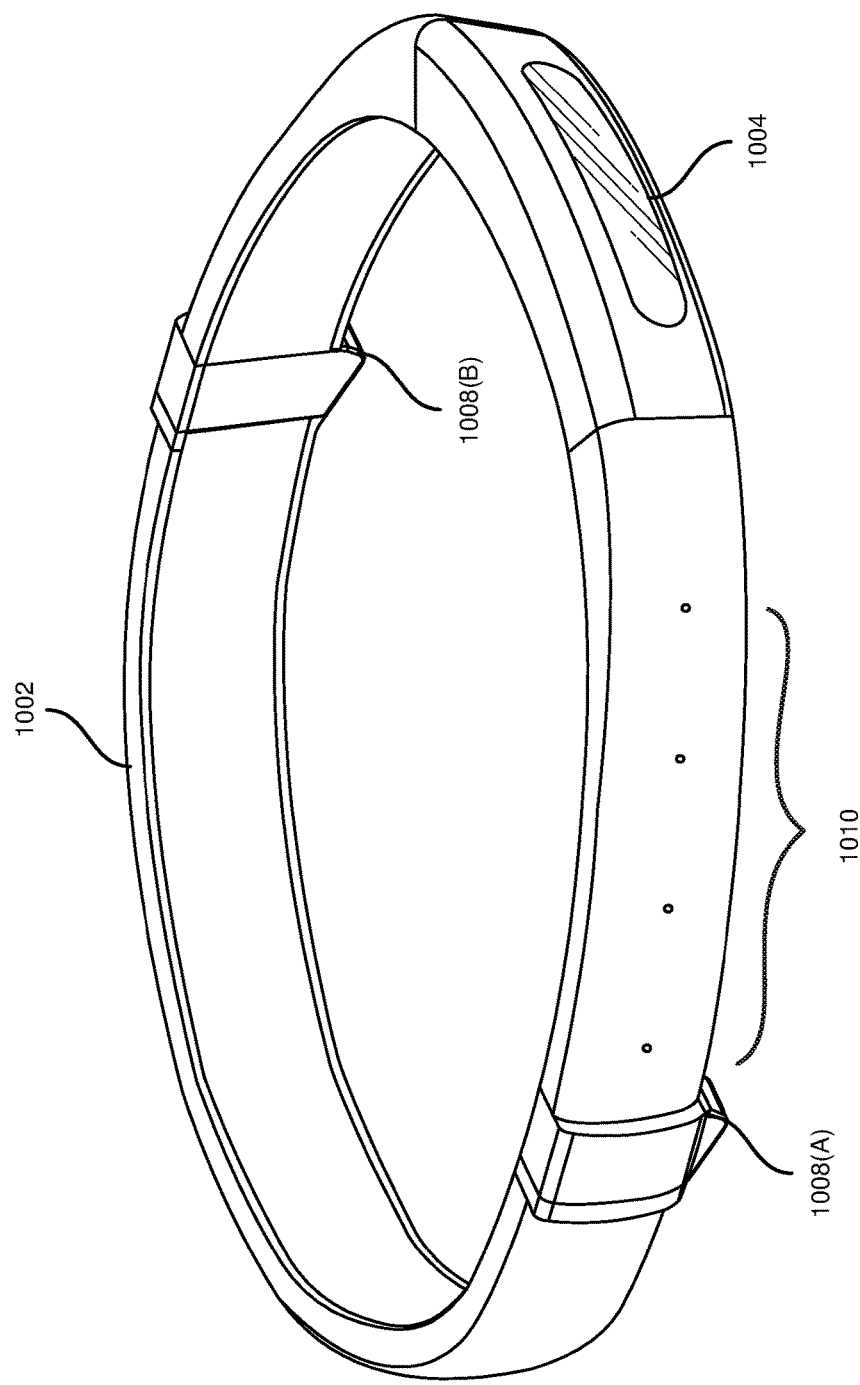
FIG. 10 is an illustration of an exemplary neckband for an artificial reality system.

Turning to FIG. 10, AR system 1000 generally represents a wearable device dimensioned to fit about a body part (e.g., a head) of a user. As shown in FIG. 10, system 1000 may include a frame 1002 and a camera assembly 1004 that is coupled to frame 1002 and configured to gather information about a local environment by observing the local environment. AR system 1000 may also include one or more audio devices, such as output audio transducers 1008(A) and 1008(B) and input audio transducers 1010. Output audio transducers 1008(A) and 1008(B) may provide audio feedback and/or content to a user, and input audio transducers 1010 may capture audio in a user's environment.

As shown, AR system 1000 may not necessarily include an NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 1000 may not include an NED, AR system 1000 may include other types of screens or visual feedback devices (e.g., a display screen integrated into a side of frame 1002).

The embodiments discussed in this disclosure may also be implemented in AR systems that include one or more NEDs.

Figure 11:
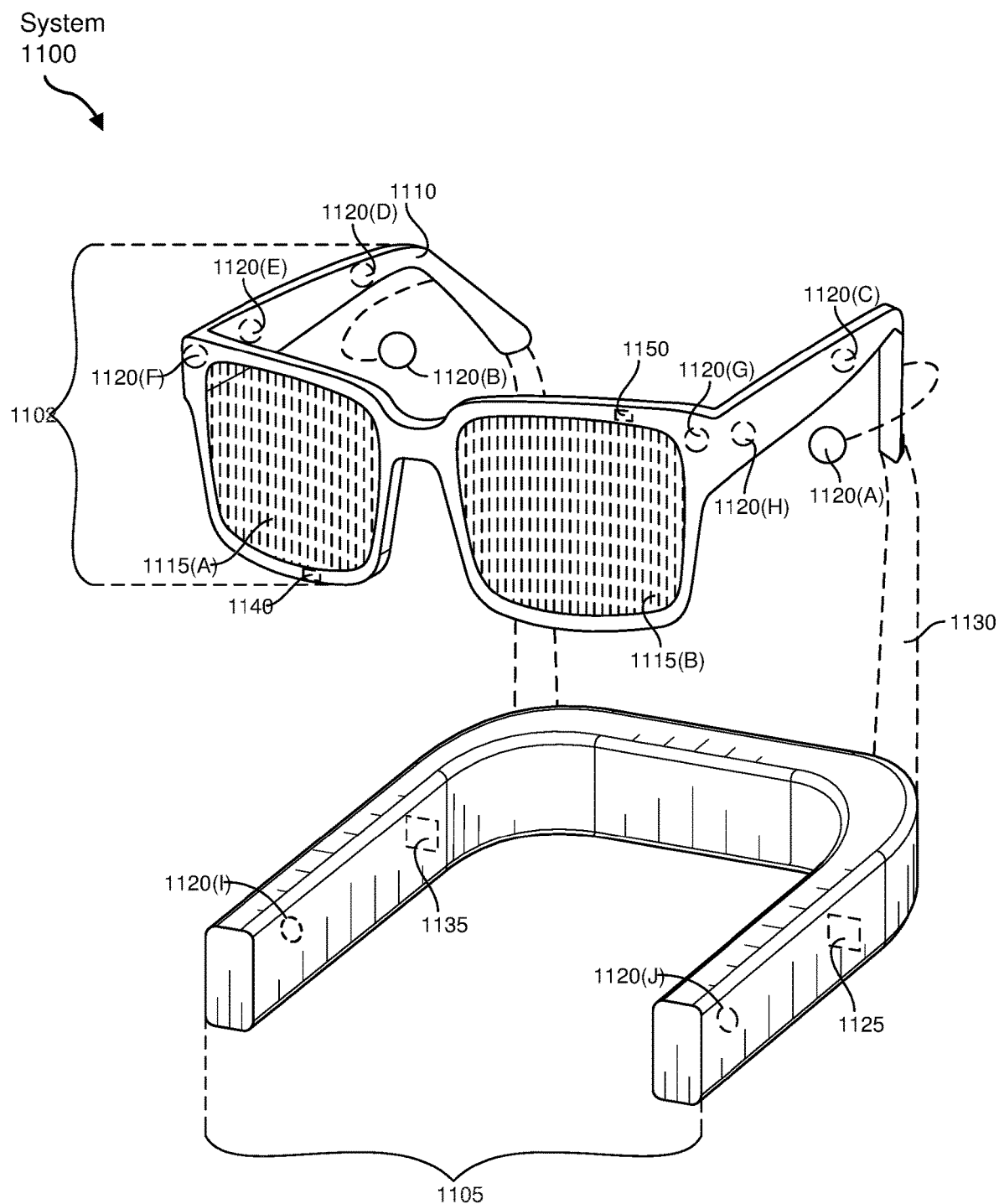
FIG. 11 is an illustration of an additional exemplary head-mounted display.

For example, as shown in FIG. 11, AR system 1100 may include an eyewear device 1102 with a frame 1110 configured to hold a left display device 1115(A) and a right display device 1115(B) in front of a user's eyes. Display devices 1115(A) and 1115(B) may act together or independently to present an image or series of images to a user. While AR system 1100 includes two displays, embodiments of this disclosure may be implemented in AR systems with a single NED or more than two NEDs.

In some embodiments, AR system 1100 may include one or more sensors, such as sensor 1140. Sensor 1140 may generate measurement signals in response to motion of AR system 1100 and may be located on substantially any portion of frame 1110. Sensor 1140 may include a position sensor, an inertial measurement unit (IMU), a depth camera assembly, or any combination thereof. In some embodiments, AR system 1100 may or may not include sensor 1140 or may include more than one sensor. In embodiments in which sensor 1140 includes an IMU, the IMU may generate calibration data based on measurement signals from sensor 1140. Examples of sensor 1140 may include, without limitation, accelerometers, gyroscopes, magnetometers, other suitable types of sensors that detect motion, sensors used for error correction of the IMU, or some combination thereof.

AR system 1100 may also include a microphone array with a plurality of acoustic sensors 1120(A)-220(J), referred to collectively as acoustic sensors 1120. Acoustic sensors 1120 may be transducers that detect air pressure variations induced by sound waves. Each acoustic sensor 1120 may be configured to detect sound and convert the detected sound into an electronic format (e.g., an analog or digital format). The microphone array in FIG. 11 may include, for example, ten acoustic sensors: 1120(A) and 1120(B), which may be designed to be placed inside a corresponding ear of the user, acoustic sensors 1120(C), 1120(D), 1120(E), 1120(F), 1120 (G), and 1120(H), which may be positioned at various locations on frame 1110, and/or acoustic sensors 1120(1) and 1120(J), which may be positioned on a corresponding neckband 1105.

The configuration of acoustic sensors 1120 of the microphone array may vary. While AR system 1100 is shown in FIG. 11 as having ten acoustic sensors 1120, the number of acoustic sensors 1120 may be greater or less than ten. In some embodiments, using higher numbers of acoustic sensors 1120 may increase the amount of audio information collected and/or the sensitivity and accuracy of the audio information. In contrast, using a lower number of acoustic sensors 1120 may decrease the computing power required by the controller 1150 to process the collected audio information. In addition, the position of each acoustic sensor 1120 of the microphone array may vary. For example, the position of an acoustic sensor 1120 may include a defined position on the user, a defined coordinate on the frame 1110, an orientation associated with each acoustic sensor, or some combination thereof.

Acoustic sensors 1120(A) and 1120(B) may be positioned on different parts of the user's ear, such as behind the pinna or within the auricle or fossa. Or, there may be additional acoustic sensors on or surrounding the ear in addition to acoustic sensors 1120 inside the ear canal. Having an acoustic sensor positioned next to an ear canal of a user may enable the microphone array to collect information on how sounds arrive at the ear canal. By positioning at least two of acoustic sensors 1120 on either side of a user's head (e.g., as binaural microphones), AR device 1100 may simulate binaural hearing and capture a 12D stereo sound field around about a user's head. In some embodiments, acoustic sensors 1120(A) and 1120(B) may be connected to AR system 1100 via a wired connection, and in other embodiments, the acoustic sensors 1120(A) and 1120(B) may be connected to AR system 1100 via a wireless connection (e.g., a Bluetooth connection). In still other embodiments, acoustic sensors 1120(A) and 1120(B) may not be used at all in conjunction with AR system 1100.

Acoustic sensors 1120 on frame 1110 may be positioned along the length of the temples, across the bridge, above or below display devices 1115(A) and 1115(B), or some combination thereof. Acoustic sensors 1120 may be oriented such that the microphone array is able to detect sounds in a wide range of directions surrounding the user wearing the AR system 1100. In some embodiments, an optimization process may be performed during manufacturing of AR system 1100 to determine relative positioning of each acoustic sensor 1120 in the microphone array.

AR system 1100 may further include or be connected to an external device (e.g., a paired device), such as neckband 1105. As shown, neckband 1105 may be coupled to eyewear device 1102 via one or more connectors 1130. Connectors 1130 may be wired or wireless connectors and may include electrical and/or non-electrical (e.g., structural) components. In some cases, eyewear device 1102 and neckband 1105 may operate independently without any wired or wireless connection between them. While FIG. 11 illustrates the components of eyewear device 1102 and neckband 1105 in example locations on eyewear device 1102 and neckband 1105, the components may be located elsewhere and/or distributed differently on eyewear device 1102 and/or neckband 1105. In some embodiments, the components of eyewear device 1102 and neckband 1105 may be located on one or more additional peripheral devices paired with eyewear device 1102, neckband 1105, or some combination thereof. Furthermore, neckband 1105 generally represents any type or form of paired device. Thus, the following discussion of neckband 1105 may also apply to various other paired devices, such as smart watches, smart phones, wrist bands, other wearable devices, hand-held controllers, tablet computers, laptop computers, etc.

Pairing external devices, such as neckband 1105, with AR eyewear devices may enable the eyewear devices to achieve the form factor of a pair of glasses while still providing sufficient battery and computation power for expanded capabilities. Some or all of the battery power, computational resources, and/or additional features of AR system 1100 may be provided by a paired device or shared between a paired device and an eyewear device, thus reducing the weight, heat profile, and form factor of the eyewear device overall while still retaining desired functionality. For example, neckband 1105 may allow components that would otherwise be included on an eyewear device to be included in neckband 1105 since users may tolerate a heavier weight load on their shoulders than they would tolerate on their heads. Neckband 1105 may also have a larger surface area over which to diffuse and disperse heat to the ambient environment. Thus, neckband 1105 may allow for greater battery and computation capacity than might otherwise have been possible on a stand-alone eyewear device. Since weight carried in neckband 1105 may be less invasive to a user than weight carried in eyewear device 1102, a user may tolerate wearing a lighter eyewear device and carrying or wearing the paired device for greater lengths of time than a user would tolerate wearing a heavy standalone eyewear device, thereby enabling an artificial reality environment to be incorporated more fully into a user's day-to-day activities.

Neckband 1105 may be communicatively coupled with eyewear device 1102 and/or to other devices. The other devices may provide certain functions (e.g., tracking, localizing, depth mapping, processing, storage, etc.) to AR system 1100. In the embodiment of FIG. 11, neckband 1105 may include two acoustic sensors (e.g., 1120(1) and 1120(J)) that are part of the microphone array (or potentially form their own microphone subarray). Neckband 1105 may also include a controller 1125 and a power source 1135.

Acoustic sensors 1120(1) and 1120(J) of neckband 1105 may be configured to detect sound and convert the detected sound into an electronic format (analog or digital). In the embodiment of FIG. 11, acoustic sensors 1120(1) and 1120 (J) may be positioned on neckband 1105, thereby increasing the distance between the neckband acoustic sensors 1120(1) and 1120(J) and other acoustic sensors 1120 positioned on eyewear device 1102. In some cases, increasing the distance between acoustic sensors 1120 of the microphone array may improve the accuracy of beamforming performed via the microphone array. For example, if a sound is detected by acoustic sensors 1120(C) and 1120(D) and the distance between acoustic sensors 1120(C) and 1120(D) is greater than, e.g., the distance between acoustic sensors 1120(D) and 1120(E), the determined source location of the detected sound may be more accurate than if the sound had been detected by acoustic sensors 1120(D) and 1120(E).

Controller 1125 of neckband 1105 may process information generated by the sensors on neckband 1105 and/or AR system 1100. For example, controller 1125 may process information from the microphone array that describes sounds detected by the microphone array. For each detected sound, controller 1125 may perform a DoA estimation to estimate a direction from which the detected sound arrived at the microphone array. As the microphone array detects sounds, controller 1125 may populate an audio data set with the information. In embodiments in which AR system 1100 includes an inertial measurement unit, controller 1125 may compute all inertial and spatial calculations from the IMU located on eyewear device 1102. Connector 1130 may convey information between AR system 1100 and neckband 1105 and between AR system 1100 and controller 1125. The information may be in the form of optical data, electrical data, wireless data, or any other transmittable data form. Moving the processing of information generated by AR system 1100 to neckband 1105 may reduce weight and heat in eyewear device 1102, making it more comfortable to the user.

Power source 1135 in neckband 1105 may provide power to eyewear device 1102 and/or to neckband 1105. Power source 1135 may include, without limitation, lithium ion batteries, lithium-polymer batteries, primary lithium batteries, alkaline batteries, or any other form of power storage. In some cases, power source 1135 may be a wired power source. Including power source 1135 on neckband 1105 instead of on eyewear device 1102 may help better distribute the weight and heat generated by power source 1135.

As noted, some artificial reality systems may, instead of blending an artificial reality with actual reality, substantially replace one or more of a user's sensory perceptions of the real world with a virtual experience. One example of this type of system is a head-worn display system, such as VR system 1200 in FIG. 12, that mostly or completely covers a user's field of view. VR system 1200 may include a front rigid body 1202 and a band 1204 shaped to fit around a user's head. VR system 1200 may also include output audio transducers 1206(A) and 1206(B). Furthermore, while not shown in FIG. 12, front rigid body 1202 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in AR system 1100 and/or VR system 1200 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 1100 and/or VR system 1200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 1000, AR system 1100, and/or VR system 1200 may include one or more optical sensors such as two-dimensional (2D) or three-dimensional (3D) cameras, time-of-flight depth sensors, single-beam or sweeping laser rangefinders, 12D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 10 and 12, output audio transducers 1008 (A), 1008(B), 1206(A), and 1206(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1010 may include condenser microphones, dynamic microphones, ribbon microphones, and/or any other type or form of input transducer. In some embodiments, a single transducer may be used for both audio input and audio output.

Figure 12:
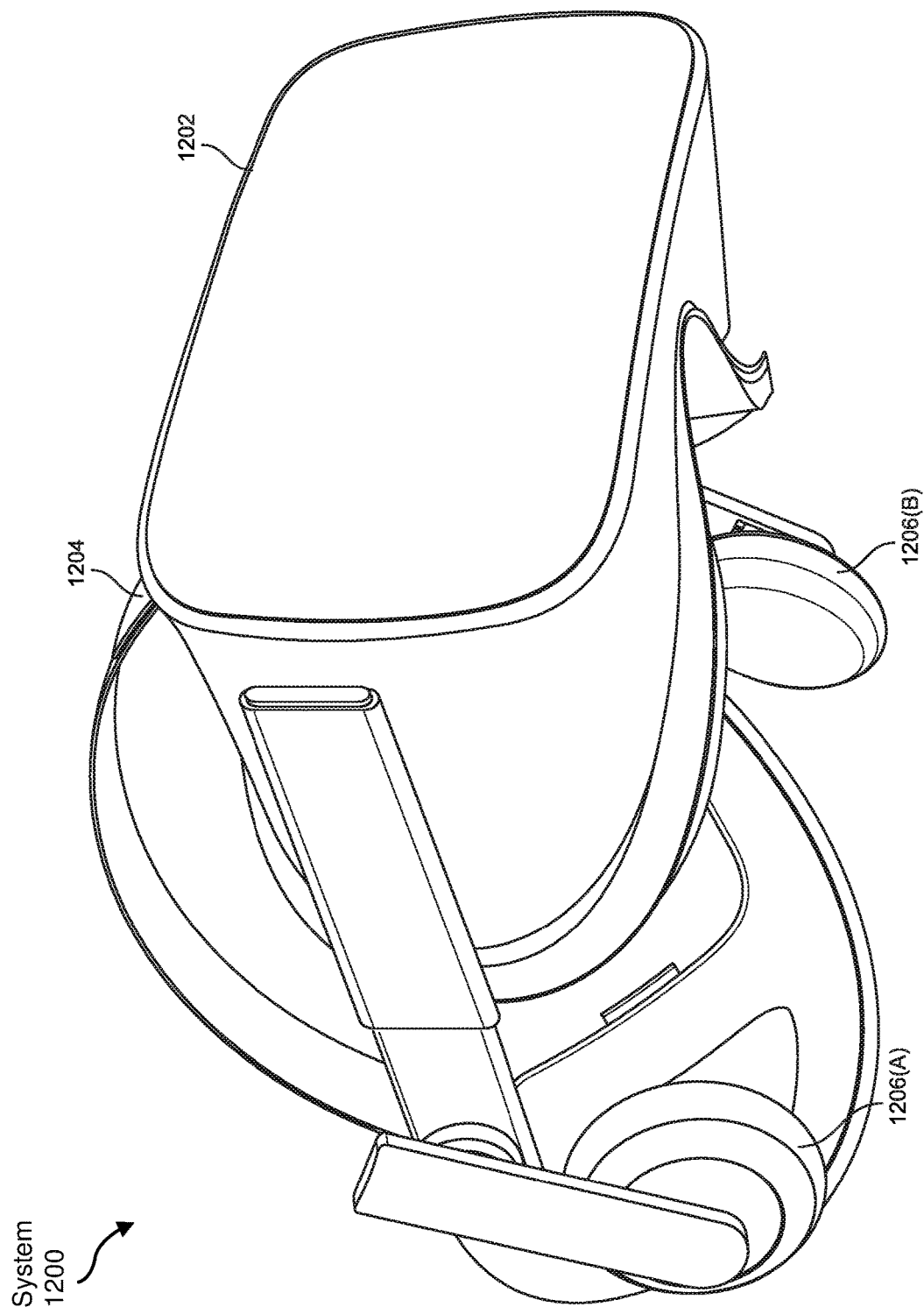
FIG. 12 is an illustration of an additional exemplary head-mounted display.

While not shown in FIGS. 10-12, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    identifying at least two streams of video data that are each produced by a different video source;
    receiving a set of at least two frames of video data that comprises exactly one frame from each of the at least two streams of video data;
    placing, within an image, the set of at least two frames of video data received from the at least two streams of video data; and
    transmitting the image that comprises the set of at least two frames of video data received from the at least two streams of video data via a single transmission channel.

2. The computer-implemented method of claim 1, wherein placing, within the image, the set of at least two frames of video data comprises arranging each frame of video data within the set of at least two frames of video data within the image based at least in part on a characteristic of the frame of video data.

3. The computer-implemented method of claim 2, wherein the characteristic comprises a readout start time of the frame of video data.

4. The computer-implemented method of claim 2, wherein the characteristic comprises an exposure length of the frame of video data.

5. The computer-implemented method of claim 2, wherein arranging each frame of video data within the image based at least in part on the characteristic of the frame of video data comprises arranging each frame of video data side by side horizontally across the image such that the vertical placement of each frame of video data within the image corresponds to the characteristic of the frame of video data.

6. The computer-implemented method of claim 1, wherein placing, within the image, the set of at least two frames of video data comprises encoding metadata that describes the set of at least two frames of video data within the image.

7. The computer-implemented method of claim 6, wherein encoding the metadata comprises encoding a timestamp of each frame from the set of at least two frames of video data.

8. The computer-implemented method of claim 6, wherein encoding the metadata comprises encoding at least one camera setting used to create each frame from the set of at least two frames of video data.

9. The computer-implemented method of claim 6, wherein encoding the metadata comprises encoding, for each frame from the set of at least two frames of video data, an identifier of a type of function being performed by a camera that recorded the frame.

10. The computer-implemented method of claim 1, wherein the at least two streams of video data are produced by at least two cameras that each comprise a different exposure length.

11. The computer-implemented method of claim 1, wherein transmitting the image via the single transmission channel comprises transmitting the image via a transmission channel that has limited bandwidth.

12. The computer-implemented method of claim 1, wherein transmitting the image via the single transmission channel comprises transmitting the image via a cable.

13. The computer-implemented method of claim 1, wherein the at least two streams of video data are produced by cameras that are coupled to a same device.

14. The computer-implemented method of claim 1, wherein transmitting the image via the single transmission channel comprises transmitting the image from a first component of a device to a second component of the device.

15. The computer-implemented method of claim 1, wherein placing, within the image, the set of at least two frames of video data received from the at least two streams of video data comprises encoding the image via a default image encoder for at least one of a camera that produced one of the at least two streams of video data or a processor that processes the image.

16. A system comprising:
at least one physical processor;
physical memory comprising computer-executable instructions that, when executed by the physical processor, cause the physical processor to:
  identify at least two streams of video data that are each produced by a different video source;
  receive a set of at least two frames of video data that comprises exactly one frame from each of the at least two streams of video data;
  place, within an image, the set of at least two frames of video data received from the at least two streams of video data; and
  transmit the image that comprises the set of at least two frames of video data received from the at least two streams of video data via a single transmission channel.

17. The system of claim 16, wherein the computer-executable instructions cause the physical processor place, within the image, the set of at least two frames of video data by arranging each frame of video data within the set of at least two frames of video data within the image based at least in part on a characteristic of the frame of video data.

18. The system of claim 16, wherein the at least two streams of video data are produced by at least one of five cameras coupled to a head-mounted display.

19. The system of claim 18, wherein the five cameras coupled to the head-mounted display comprise:
  two cameras positioned on a left side of the head-mounted display;
  two cameras positioned on a right side of the head-mounted display; and
  one camera positioned on a front of the head-mounted display.

20. A non-transitory computer-readable medium comprising one or more computer-readable instructions that, when executed by at least one processor of a computing device, cause the computing device to:
  identify at least two streams of video data that are each produced by a different video source;
  receive a set of at least two frames of video data that comprises exactly one frame from each of the at least two streams of video data;
  place, within an image, the set of at least two frames of video data received from the at least two streams of video data; and
  transmit the image that comprises the set of at least two frames of video data received from the at least two streams of video data via a single transmission channel.

* * * * *

UNITED STATES PATENT AND TRADEMARK OFFICE
CERTIFICATE OF CORRECTION

PATENT NO.       : 10,536,666 B1
APPLICATION NO.  : 16/253902
DATED            : January 14, 2020
INVENTOR(S)      : John Enders Robertson Page 1 of 1

It is certified that error appears in the above-identified patent and that said Letters Patent is hereby corrected as shown below:

On the Title Page

In Column 2, item (74), Attorney, Line 1, delete "FisherBroyle," and insert -- FisherBroyles, --, therefor.

Signed and Sealed this
Third Day of March, 2020

Andrei Iancu
*Director of the United States Patent and Trademark Office*